Feb. 21, 1961 D. D. HUNT 2,972,375
APPARATUS FOR REMOVING A WHEEL FROM
A PNEUMATIC TIRE CASING
Filed May 11, 1959 2 Sheets-Sheet 2
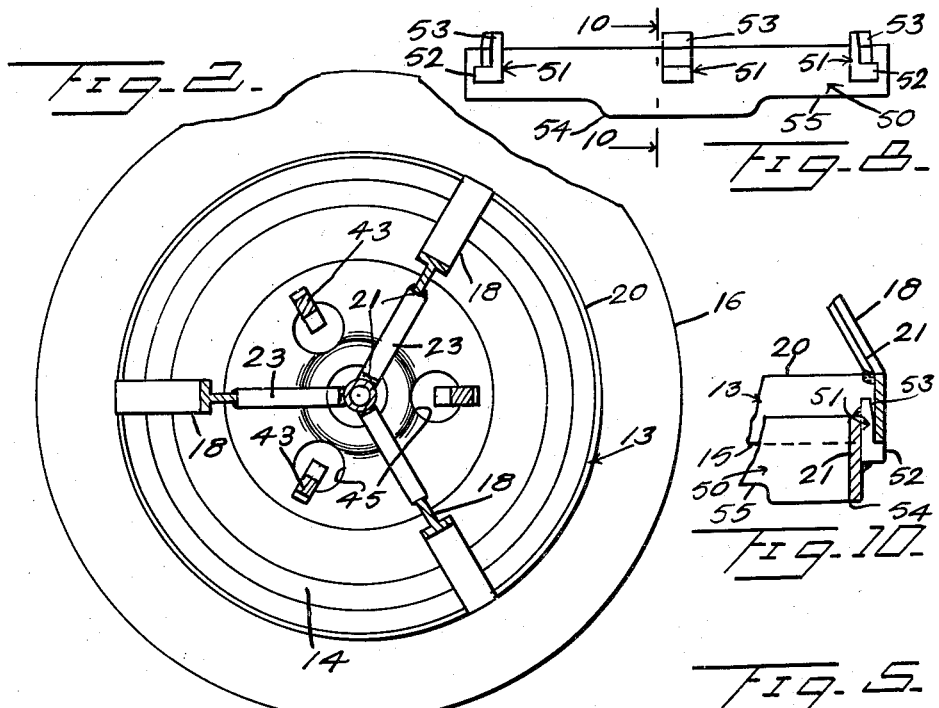
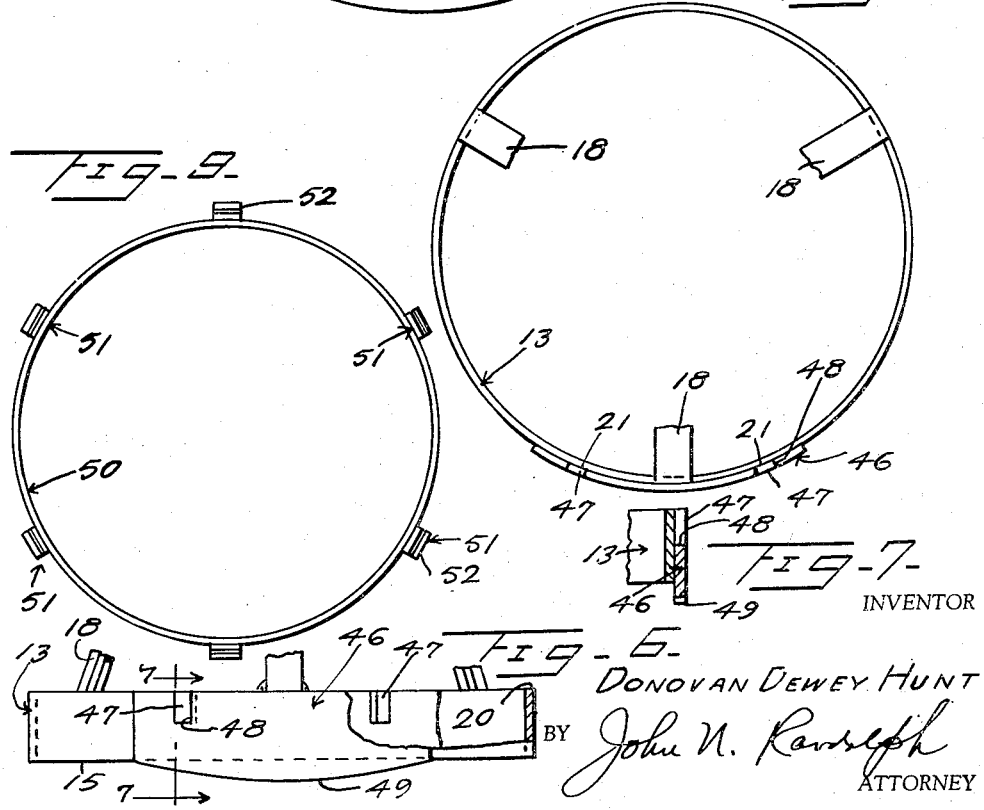
INVENTOR
DONOVAN DEWEY HUNT
BY John N. Randolph
ATTORNEY

United States Patent Office 2,972,375
Patented Feb. 21, 1961

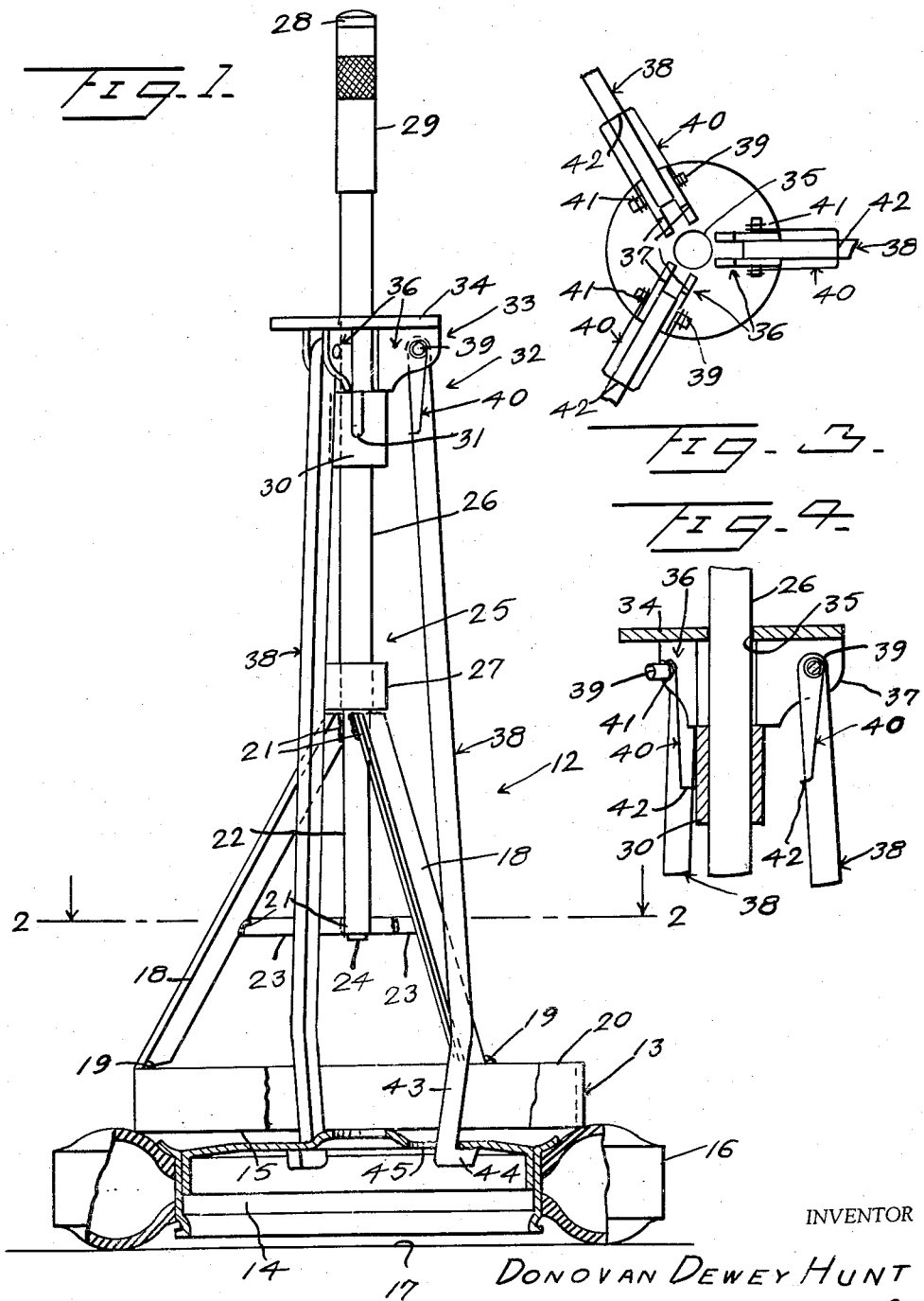

2,972,375

APPARATUS FOR REMOVING A WHEEL FROM A PNEUMATIC TIRE CASING

Donovan Dewey Hunt, 130 N. 44th St., Louisville, Ky., assignor of forty-nine percent to Michael S. Murphy, Louisville, Ky.

Filed May 11, 1959, Ser. No. 812,505

3 Claims. (Cl. 157—1.2)

This invention relates to an apparatus of extremely simple construction which is manually operated and self-contained, by means of which a vehicle wheel can be forcibly extracted from a pneumatic tire casing, even when the tire casing has become stuck to the wheel rim.

Another object of the invention is to provide an apparatus or machine of the aforedescribed character including means for effectively breaking a portion of the tire casing loose from the wheel rim, where too great a force would be required to break the entire casing loose from the rim simultaneously.

Still another object of the invention is to provide a wheel and tire casing separator which may be readily adjusted by the use of adapter means to fit vehicle wheels and tires of different diameters.

Still another object of the invention is to provide a tire and wheel separating apparatus having novel means to quickly and efficiently anchor the apparatus to the wheel and which is so constructed that such anchoring means may be effectively secured to vehicle wheels of varying designs.

Various other objects and advantages of the invention will hereinafter become more fully apparent from the following description of the drawings, illustrating a presently preferred embodiment thereof, and wherein:

Figure 1 is a side elevational view, partly broken away and partly in vertical section, showing the wheel and tire separating apparatus in an applied position;

Figure 2 is a horizontal sectional view of the apparatus, shown applied to a wheel and tire, taken substantially along a plane as indicated by the line 2—2 of Figure 1;

Figure 3 is a fragmentary bottom plan view of a part of the apparatus;

Figure 4 is a fragmentary vertical sectional view of a part of the apparatus;

Figure 5 is a horizontal sectional view, partly in top plan, of the lower portion of the apparatus and illustrating an attachment applied to the tire engaging part of the apparatus;

Figure 6 is a fragmentary side elevational view, partly broken away and partly in section, of the parts as shown in Figure 5;

Figure 7 is a fragmentary vertical sectional view taken substantially along a plane as indicated by the line 7—7 of Figure 6;

Figure 8 is a side elevational view illustrating another attachment of the apparatus;

Figure 9 is a top plan view of the attachment as shown in Figure 8, and

Figure 10 is a vertical sectional view taken substantially along a plane as indicated by the line 10—10 of Figure 8 and showing a portion of the attachment of Figures 8 and 9 in an applied position.

Referring more specifically to the drawings, the wheel and tire separating apparatus in its entirety is designated generally 12 and includes a ring 13 of substantial width and of a diameter larger than a vehicle wheel 14, so that a bottom edge 15 of the ring 13 can rest upon an upper side wall of a pneumatic tire 16 and will be disposed around and spaced outwardly from the outermost peripheral portion of the wheel 14, when the other side wall of the tire 16 is resting on a floor or other supporting surface 17. The ring 13 is of sufficient width and thickness to be rigid. A plurality, preferably three rigid braces 18 have lower ends rigidly secured by butt welds 19 to the upper edge 20 of the ring 13. The braces 18 extend upwardly in converging relation to one another and have their upper ends secured, preferably by welding, as seen at 21, to a rigid tube 22. Three rigid braces 23 have inner ends secured to the lower end of the tube 22 and outer ends secured to the braces 18, approximately midway of the ends of the braces 18. The braces 23 may be secured to the tube 22 and braces 18, by additional welds 21. The lower end of the tube 22 is suitably closed and sealed, as by a closure 24. The tube 22 is supported axially relative to the ring 13 by the braces 18 and 23.

The tube 22 constitutes a stationary part of a conventional self-contained fluid pressure operated extensible member or jack, designated generally 25, and which additionally includes a long sleeve 26 which engages telescopically over the upper portion of the tube 22. A collar 27 is secured to the lower end of the sleeve 26 and is provided with means, not shown, for providing a seal between said sleeve 26 and the tube 22. The collar 27 is disposed above the braces 18 and is movable upwardly and downwardly with the sleeve 26 on the tube 22 and relative to the braces 18 and ring 13. A head 28, constituting the upper end of the unit 25, is connected to and operates mechanism, not shown, contained within the sleeve 26 and tube 22 for effecting up and down movement of the sleeve 26. A guide sleeve 29, forming a handle, is secured to the head 28 and telescopes over and slidably engages the upper portion of the sleeve 26. A collar 30 is slidably mounted on the sleeve 26 between the collar 27 and guide sleeve or handle 29 and is provided with a manually operated setscrew 31 for adjustably clamping the collar 30 to the sleeve 26, so that said collar will then move in unison with the sleeve 26.

Briefly stated, the operation of the unit 25 is as follows: Reciprocation of the handle 29 which is manually engaged by the operator causes an up and down movement of the head 28 and parts connected thereto for pressurizing the lower portion of the tube 22 below a piston, not shown, contained therein, for displacing the parts 26, 27, 30 upwardly. By moving the guide sleeve or handle 29 downwardly to a lowermost position relative to the sleeve 26 and by then rotating said handle 29 and head 28 in a clockwise direction, as viewed from above, means contained within the unit 25 will be operated to effect release of the pressure from the lower portion of the tube 22 upwardly through the unit so that the parts 26, 27 and 30 may then be forced downwardly and back to their positions of Figure 1. The unit 25 may correspond to the Bumper Jack as disclosed in the patent to L. D. Nilson No. 2,146,403, granted February 7, 1939, and accordingly a further description of the unit 25 is considered unnecessary.

A wheel anchoring unit, designated generally 32, includes a head 33 having a rigid disc 34 provided with a central opening 35 through which the sleeve 26 loosely extends, for slidably mounting said head on the unit 25 between the collar 30 and the handle 29. A plurality, preferably three brackets 36 are rigidly secured to and depend from the underside of the disc 34, around and spaced from the opening 35. Each of the brackets 36 is disposed radially of the disc 34 and includes spaced substantially parallel ears 37. An end of an elongated rigid rod 38 fits loosely in each bracket 36, between the ears 37 thereof, and a pivot pin 39 extends through said ears 37 and loosely through said end of the bar 38 for swingably connecting the bar 38 to the head 33. The three bars 38 extend downwardly from the head 33 and are supported by the pivot pins 39 for swinging movement outwardly and inwardly relative to one another and to the unit 25, ring 13 and braces 18. A spring 40 is associated with each bar 38. Each spring 40 has end portions 41 which are wound about the pivot pin 39 of the bar 38 with which said spring is associated, and an intermediate portion 42 which extends across and bears against the inner edge of the bar 38, beneath and spaced from its pivot 39. The springs 40 are of considerable strength to forcibly urge the bars 38 to swing outwardly relative to one another. The bars 38, near their opposite, free ends, have inwardly curved free end portions 43 which terminate in outturned hooks 44.

The wheel 14 is a conventional fifteen inch wheel. With the wheel and tire lying on the surface 17, as shown in Figure 1, the bottom edge 15 of the ring is placed on the upper wall of the tire 16. The setscrew 31 is loosened so that the collar 30 can be slid downwardly toward the collar 27. With the bars 38 held against outward swinging movement, the head 33 is allowed to slide downwardly on the sleeve 26 and so that the hooks 44 will pass through the ring 13 with the bars 38 straddling the braces 18. The wheel 14 is shown provided with a number of openings 45 which are spaced from the center of the wheel and the hooks 44 are guided downwardly through said openings 45, after which the bars 38 are released to swing outwardly under the biasing action of the springs 40 so that the hooks 44 will be anchored to the wheel 14, as seen in Figure 1. If the wheel is provided with only a single large central opening, not shown, all three of the hooks 44 may be passed downwardly through said opening before the bars are released for outward swinging movement for anchoring the hooks to the wheel around the opening. The collar 30 is then displaced upwardly against the lower ends of the ears 37, as seen in Figures 1 and 4, and the setscrew 31 is tightened for clamping the collar to the sleeve 26, so that the hooks 44 will bear tightly against the under or inner side of the wheel. The unit 25 is then manually operated, as previously described, by manipulation of the handle 29 for extending the sleeve 26 to raise the collar 30 relative to the braces 18 and ring 13. This will cause the wheel 14 to be pulled upwardly through the ring 13 by the bars 38 and out of engagement with the tire 16. Actually, during initial upward movement of the anchoring unit 32, the tube 22, ring 13 and braces 18 and 23 will be forced downwardly toward the floor surface 17 and relative to the wheel 14 for collapsing the upper side wall of the tire 16 and for forcing it away from the upper flange of the wheel rim to thus break any sealing engagement of said rim flange with said tire wall, so that the wheel 14 can thereafter be more readily extracted upwardly from the tire 16 and through the ring 13.

Should the tire walls be badly stuck to the wheel rim or for certain types of conventional vehicle wheels from which it is difficult to remove a tire, a shoe attachment 46, as illustrated in Figures 5 to 7, is applied to a portion of the exterior of the ring 13. For this purpose, the ring 13 is provided on its exterior with two circumferentially spaced transversely extending lugs 47 which may be welded, as seen at 21 in Figure 5, to the ring 13 and which extend downwardly from the upper edge 20 of said ring and which terminate approximately midway between the upper and lower edges of the ring. The shoe 46 comprises an elongated longitudinally bowed plate which is curved to conformably engage against the outer side of a portion of the ring 13, as seen in Figure 5, and which has transversely extending slots 48 intermediate of its ends. The slots 48 open outwardly of the upper edge of the shoe 46 and are each of a length substantially corresponding to the length of the lugs 47 so that when the plate or shoe 46 is positioned against the outer side of the ring 13 with the lugs 47 engaging in the slots or notches 48, the upper edge of the plate 46 will be disposed substantially flush with the upper edge 20 of the ring 13. The shoe 46 has a convexly bowed bottom edge 49 extending from end-to-end thereof and which protrudes below the bottom edge 15 of the ring 13, when the shoe is applied to the ring, as illustrated in Figures 6 and 7. The bottommost portion of said lead edge 49 preferably extends approximately ⅞ of an inch below the bottom ring edge 15. It will be readily apparent that when the shoe 46 is utilized with the tire and wheel separator 12 that the lead edge 49 of the shoe 46 will exert a maximum pressure on a limited portion only of the upper tire wall to force said portion away from the upper flange of the wheel so that the wheel can be more readily extracted from the tire. If necessary, pressure can be released on the unit 25 so that the ring 13 can be turned to position the lead portion 49 of the shoe against different parts of the upper side wall of the tire in effecting removal of the tire from the wheel.

Figures 8, 9 and 10 illustrate an adapter ring 50 for use with the ring 13 for removing smaller diameter tires. The ring 50 is adapted for removing tires of fourteen inch wheels. Said ring is provided on its outer side with a plurality, preferably six lugs 51 which may be welded thereto, as seen at 21, in Figure 10. The lugs 51 terminate above the bottom edge of the ring 50 and extend to above the upper edge thereof. Said lugs 51 have outwardly projecting bottom portions forming upwardly facing shoulders 52 and the upper ends of the lugs are beveled on their outer sides, as seen at 53. The ring 50 has a single lead portion 54, the bottom edge of which is disposed below the level of a bottom edge 55 of the remainder of the ring 50.

The adapter ring 50 is inserted upwardly into the ring 13 and the lower portion of the ring 13 fits snugly around the lugs 51 with the shoulders 52 of said lugs bearing against the bottom edge 15. The beveled portions 53 assist in guiding the adapter ring 50 into position in the ring 13.

The tire and wheel separator apparatus 12 functions in the same manner as previously described when the adapter ring 50 is utilized. The lead portion 54 of the fourteen inch adapter ring 50 functions in the same manner and for the same purpose as the lead edge 49 of the shoe 46.

Various modifications and changes are contemplated and may be resorted to, without departing from the function or scope of the invention as hereinafter defined by the appended claims.

I claim as my invention:

1. An apparatus for separating a pneumatic tire from a vehicle wheel comprising a rigid ring having a bottom edge adapted to rest upon a side wall of a tire around and spaced outwardly from the rim of a wheel, brace members fixed to and extending upwardly from said ring, a self-contained manually operated extensible unit including a part secured to said brace members and extending upwardly therefrom and a second part movable relative to said first mentioned part away from the ring when said extensible unit is manually actuated, a thrust collar slidably mounted and longitudinally adjustable on said second part, means adjustably clamping the thrust collar to said second part, a wheel anchoring assembly including a head slidably supported on said extensible unit above said brace members, said head being disposed above and bearing against said thrust collar, a plurality of bars swingably connected to and extending downwardly from said head through said ring, and said bars having hook shaped lower free ends adapted to extend through and engage portions of the wheel for securing the wheel to said assembly and for pulling the wheel through the ring to separate the tire from the wheel when, said extensible unit is actuated for displacing said second part away from the ring.

2. An apparatus as in claim 1, an adapter shoe, means for detachably mounting said adapter shoe against a portion of the outer side of said ring, said adapter shoe having a bottom edge convexly bowed from end-to-end thereof and extending downwardly from the plane of the bottom edge of the ring for engaging a part of the upper side wall of the tire ahead of the ring.

3. An apparatus as in claim 1, an adapter ring of smaller diameter than said first mentioned ring, said adapter ring having lugs on the outer side thereof, said lugs having lower portions provided with upwardly facing shoulders, said adapter ring being inserted into said first mentioned ring through the bottom thereof and said lugs fitting snugly within said first mentioned ring, the bottom edge of said first mentioned ring bearing against the shoulders of said lugs, and the bottom edge of said adapter ring being disposed below the bottom edge of the first mentioned ring and being adapted to engage against a tire wall around a wheel of smaller diameter.

References Cited in the file of this patent

UNITED STATES PATENTS

| | | |
|---|---|---|
| 1,170,612 | Covey | Feb. 8, 1916 |
| 1,890,746 | O'Dell | Dec. 13, 1932 |
| 2,406,996 | Colley | Sept. 3, 1946 |
| 2,537,041 | Finch | Jan. 9, 1951 |
| 2,538,962 | Branick | Jan. 23, 1951 |
| 2,566,315 | Christofoli et al. | Sept. 4, 1951 |
| 2,580,926 | Johnson et al. | Jan. 1, 1952 |
| 2,595,258 | Hildred | May 6, 1952 |
| 2,703,605 | Manupello | Mar. 8, 1955 |
| 2,762,424 | Zito | Sept. 11, 1956 |